United States Patent
Arai (10) Patent No.: US 10,105,778 B2
(45) Date of Patent: Oct. 23, 2018

(54) JOINT PART

(71) Applicant: MITSUBISHI HEAVY INDUSTRIES ENGINE & TURBOCHARGER, LTD., Sagamihara-shi, Kanagawa (JP)

(72) Inventor: Takashi Arai, Tokyo (JP)

(73) Assignee: MITSUBISHI HEAVY INDUSTRIES ENGINE & TURBOCHARGER, LTD., Sagamihara-Shi (JP)

( * ) Notice: Subject to any disclaimer, the term of this patent is extended or adjusted under 35 U.S.C. 154(b) by 313 days.

(21) Appl. No.: 14/361,539

(22) PCT Filed: Nov. 19, 2012

(86) PCT No.: PCT/JP2012/079974
§ 371 (c)(1),
(2) Date: May 29, 2014

(87) PCT Pub. No.: WO2013/080828
PCT Pub. Date: Jun. 6, 2013

(65) Prior Publication Data
US 2014/0321905 A1    Oct. 30, 2014

(30) Foreign Application Priority Data

Dec. 1, 2011 (JP) ................... 2011-264137

(51) Int. Cl.
*B23K 1/19* (2006.01)
*C22C 14/00* (2006.01)
(Continued)

(52) U.S. Cl.
CPC .............. *B23K 1/19* (2013.01); *B23K 1/0018* (2013.01); *B23K 35/002* (2013.01);
(Continued)

(58) Field of Classification Search
CPC ...................................................... B23K 1/19
See application file for complete search history.

(56) References Cited

U.S. PATENT DOCUMENTS

| | | |
|---|---|---|
| 6,007,301 A | 12/1999 | Noda et al. |
| 2007/0199977 A1 | 8/2007 | Pollard et al. |
| 2008/0199313 A1 | 8/2008 | Nitta et al. |

FOREIGN PATENT DOCUMENTS

| | | |
|---|---|---|
| CN | 1183334 A | 6/1998 |
| CN | 1737525 A | 2/2006 |

(Continued)

OTHER PUBLICATIONS

J.R. Davis, "Selection of Wrought Martensitic Stainless Steels," Welding, Brazing, and Soldering, vol. 6, ASM Handbook, ASM International, 1993, p. 432-442.*

(Continued)

*Primary Examiner* — Christopher S Kessler
(74) *Attorney, Agent, or Firm* — Birch, Stewart, Kolasch & Birch, LLP (57) ABSTRACT

Provided is joint part capable of suppressing diffusion of carbon and nitrogen contained in the steel member to the TiAl-based alloy member and suppressing formation of voids, titanium carbide or a nitride due to diffusion of carbon and nitrogen contained in the steel member, and thereby suppressing decrease in the brazing strength. A joint part comprises a steel member containing alloy elements including C and Cr, a TiAl-based alloy member, and a Ni-based brazing filler metal via which the steel member and the TiAl-based alloy member are joined to each other, wherein the steel member has a carbide and a nitride each forming a bond with at least one of the alloy elements at least on a side of a boundary with the Ni-based brazing filler metal, and diffusion of C and N to the Ni-based brazing filler metal adjacent to the TiAl-based alloy member is suppressed by
(Continued)

the carbide and the nitride. The joint part may be a turbine body 1 comprising a turbine wheel 2 and a shaft 3, and a structural steel material of the shaft 3 is structural steel material containing 0.30 to 0.45 wt % of C and 0.85 to 1.25 wt % of Cr, or a martensitic stainless steel material containing at most 15 wt % of C and 11.5 to 13 wt % of Cr.

5 Claims, 5 Drawing Sheets

(51) Int. Cl.
  C22C 38/00 (2006.01)
  C22C 38/18 (2006.01)
  C22C 38/38 (2006.01)
  F02B 39/00 (2006.01)
  B32B 15/01 (2006.01)
  F01D 5/06 (2006.01)
  B23K 35/30 (2006.01)
  B23K 35/00 (2006.01)
  B23K 35/02 (2006.01)
  C22C 38/22 (2006.01)
  C22C 38/40 (2006.01)
  B23K 1/00 (2006.01)
  F01D 5/02 (2006.01)
  B23K 101/00 (2006.01)
  B23K 103/24 (2006.01)

(52) U.S. Cl.
  CPC .......... *B23K 35/004* (2013.01); *B23K 35/005* (2013.01); *B23K 35/0222* (2013.01); *B23K 35/3033* (2013.01); *B32B 15/013* (2013.01); *C22C 14/00* (2013.01); *C22C 38/00* (2013.01); *C22C 38/18* (2013.01); *C22C 38/22* (2013.01); *C22C 38/38* (2013.01); *C22C 38/40* (2013.01); *F01D 5/063* (2013.01); *F02B 39/00* (2013.01); *B23K 2201/001* (2013.01); *B23K 2203/24* (2013.01); *C21D 2211/004* (2013.01); *C21D 2211/008* (2013.01); *F01D 5/026* (2013.01); *F05D 2220/40* (2013.01); *F05D 2230/23* (2013.01); *F05D 2230/236* (2013.01); *Y10T 403/479* (2015.01)

(56) References Cited

FOREIGN PATENT DOCUMENTS

| | | |
|---|---|---|
| CN | 1748931 A | 3/2006 |
| CN | 101972877 A | 2/2011 |
| CN | 102120281 A | 7/2011 |
| CN | 102211249 A | 10/2011 |
| CN | 102259217 A | 11/2011 |
| JP | 8-311143 A | 11/1996 |
| JP | 10-8924 A | 1/1998 |
| JP | 10-118764 A | 5/1998 |
| JP | 10-124780 A | 5/1998 |
| JP | 10-193087 A | 7/1998 |
| JP | 11-673 A | 1/1999 |
| JP | 2001-1031 A | 1/2001 |
| JP | 2001-205443 A | 7/2001 |
| JP | 2002-252810 A | 9/2002 |
| JP | 3453302 A | 7/2003 |
| JP | 2004-90130 A | 3/2004 |
| JP | 3534633 A | 3/2004 |
| JP | 2005-82844 A | 3/2005 |
| JP | 2006-297474 A | 11/2006 |
| JP | 2007-229792 A | 9/2007 |
| JP | 2008-111156 A | 5/2008 |
| JP | 2010-5643 A | 1/2010 |

OTHER PUBLICATIONS

Nickel Chromium Molybdenum Steels, Japanese Industrial Standard, JIS G 4103-1979, pp. 1-10, Jun. 1, 1994, Japanese Standards Association, Tokyo, Japan.*
"Welding Handbook: Material Welding," China Mechanical Engineering Welding Society, China Mechanical Industrial Press, Jan. 2008, Edition 3, vol. 2, pp. 464-468.
Chinese Office Action for Chinese Application No. 201280057615.7, dated Jul. 24, 2015, along with an English translation thereof.
Extended European Search Report effective Dec. 4, 2015 issued to the corresponding EP Application No. 12853153.0.
International Preliminary Report on Patentability and Written Opinion of the International Searching Authority (Forms PCT/IB/338, PCT/IB/373, PCT/IB/326 and PCT/ISA/237) and English translation thereof, dated Jun. 12, 2014, for International Application No. PCT/JP2012/079974.
International Search Report (Forms PCT/ISA/220 and PCT/ISA/210), dated Feb. 19, 2013, for International Application No. PCT/JP2012/079974.
Chinese Office Action for Chinese Application No. 201280057615.7, dated Jan. 15, 2016, along with an English translation thereof.
Decision to Grant a Patent for corresponding JP Application No. 2013-547101, dated Jan. 25, 2016, along with an English translation thereof.
Disc Shaft Manufacturing Technology; Modern Manufacturing Technology of Turbomachinery: pp. 142-144, Science Press, Oct. 2002.
Handbook of Stainless Steel, YanBiao, pp. 399-400; Chemical Industry Press—Jul. 31, 2009.
European Office action dated Jun. 1, 2017 in corresponding European Application No. 12853153.0.
Notice of Allowance dated May 30, 2016 in corresponding Chinese Application No. 201280057615.7.

* cited by examiner

Related Art

FIG.6

Related Art

FIG.7

Related Art

JOINT PART

TECHNICAL FIELD

The present invention relates to a joint part comprising a steel member containing alloy elements including C and Cr, a TiAl-based alloy member, and a Ni-based brazing filler metal via which the steel member and the TiAl-based alloy member are joined to each other, particularly to a joint part comprising a steel member and a TiAl-based alloy member in production of turbines such as turbine wheels of compact turbochargers for automobiles and trucks, and turbine blades for large-size turbochargers for ships, jet engines and industrial gas turbines.

BACKGROUND

With the increase in concern about environmental issues in recent years, improvement in performance of turbochargers used for transport machinery such as automobiles and trucks, and improvement in efficiency of jet engines and industrial gas turbines, are required. A turbine is one of important components which have effects on performance and efficiency of the above products, and in recent years, development of a high-temperature turbine has been desired.

Figure 5:
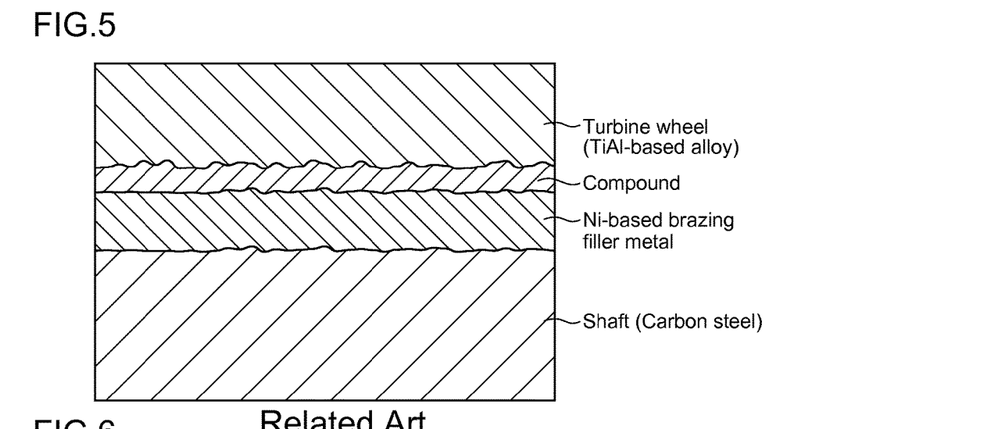
FIG. 5 is a schematic diagram illustrating a joint portion of a turbine wheel and a shaft of a normal turbine.

As a material expected to be useful for improvement of performance of the above products, an alloy having an intermetallic compound TiAl as a main phase (herein after referred to as "TiAl-based alloy member") is known. For example, Patent Document 1 discloses, as shown in FIG. 5, a joint part obtained by brazing a turbine wheel as a TiAl-based alloy member and a shaft as a steel member as a material having high viscosity and workability, with a Ni-based brazing filler metal.

CITATION LIST

Patent Literature

Patent Document 1: JP 2004-90130 A

SUMMARY

Technical Problem

Figure 6:
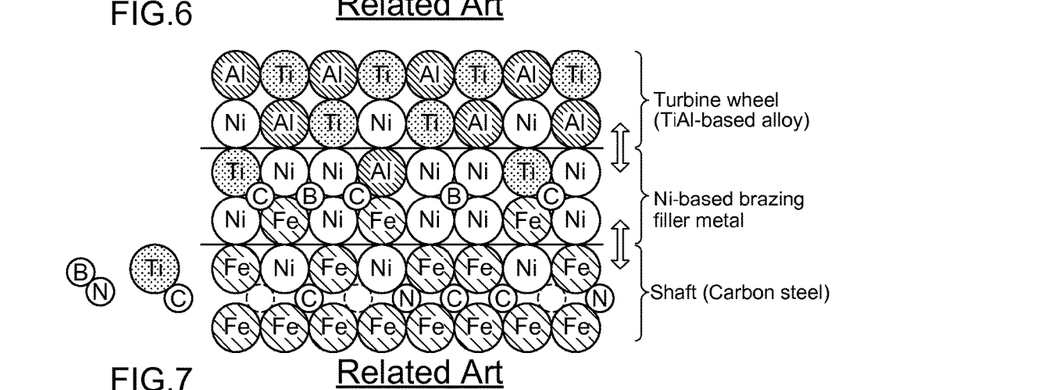
FIG. 6 is a schematic diagram illustrating atomic state of a joint portion of a turbine wheel and a shaft of a turbine after operation under a high temperature condition over a long period of time.
Figure 7:
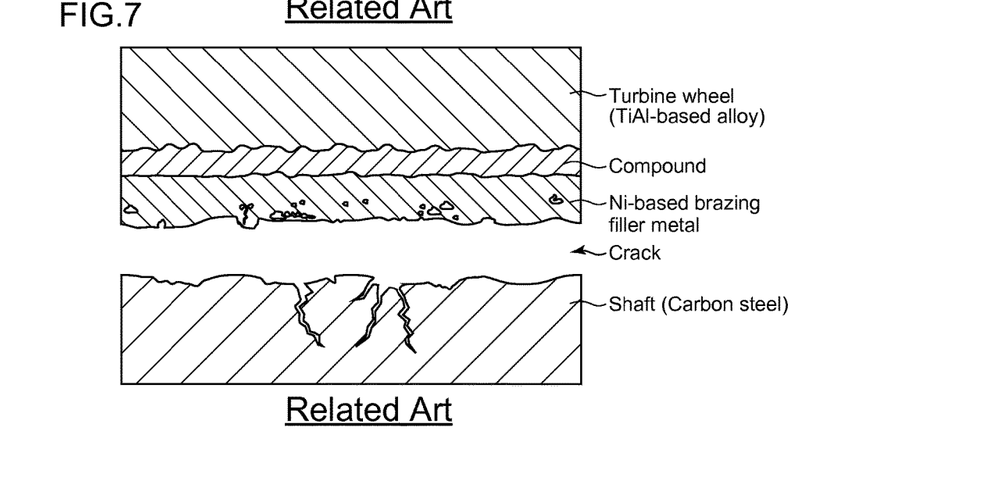
FIG. 7 is a schematic diagram illustrating a joint portion of a turbine wheel and a shaft after a damage of a turbine.

However, as carbon, which is contained in the shaft of the joint part described in Patent Document 1, has an atomic radius smaller than titanium, aluminum and nickel, and therefore, as illustrated in FIG. 6, when the turbine is operated under a high temperature condition over a long period of time, carbon and nitrogen present in the shaft may be transferred into the turbine wheel, or titanium present in the turbine wheel or boron present in the Ni-based brazing filler metal may be transferred into the shaft, due to diffusion. Thus, there is a problem such that in the vicinity of the boundary between the shaft and the Ni-based brazing filler metal, voids having aggregated holes arising due to diffusion of carbon, titanium carbide formed by bonding between titanium and carbon, and a nitride formed by bonding between boron and nitrogen, may be formed a lot, which leads to a significant decrease in the brazing strength. Furthermore, when the turbine having formed voids, titanium carbide and a nitride, is subjected to a heat cycle condition where a low temperature condition and a high temperature condition are alternately repeated, a thermal stress due to a difference in the linear expansion coefficient between the turbine wheel and the shaft, may concentrate and act on the boundary between the shaft and the Ni-based brazing filler metal. Then, as shown in FIG. 7, cracks may arise and the turbine may be damaged due to the thermal stress.

In view of the above problem, the present invention is to provide a joint part capable of suppressing diffusion of carbon and nitrogen contained in the steel member to the TiAl-based alloy member and suppressing formation of voids, titanium carbide or a nitride due to diffusion of carbon and nitrogen contained in the steel member, and thereby suppressing decrease in the brazing strength.

Solution to Problem

In order to solve the above problem, the joint part according to the present invention comprises a steel member containing alloy elements including C and Cr, a TiAl-based alloy member, and a Ni-based brazing filler metal via which the steel member and the TiAl-based alloy member are joined to each other, wherein the steel member has a carbide and a nitride each forming a bond with at least one of the alloy elements at least on a side of a boundary with the Ni-based brazing filler metal, and diffusion of C and N to the Ni-based brazing filler metal adjacent to the TiAl-based alloy member is suppressed by the carbide and the nitride.

The alloy elements may include, in addition to Cr, Nb, V or the like which is an alloy element capable of forming a bond with C or N to generate a carbide or a nitrogen.

According to the above joint part, diffusion of C and N to the Ni-based brazing filler metal adjacent to the TiAl-based alloy member may be suppressed, whereby it is possible to suppress formation of voids, a carbide or a nitride in the vicinity of the boundary between the steel member and the Ni-based brazing filler metal due to the diffusion of C and N in the steel member. In a conventional joint part, voids, titanium carbide or a nitride may be formed a lot in the vicinity of the boundary between the steel member and the Ni-based brazing filler metal. When a stress acts on a portion where such voids, titanium carbide or a nitride are present, cracks may arise and the steel member may be damaged. However, in the joint part according to the present invention, voids, titanium carbide or a nitride will hardly be formed in the vicinity of the boundary between the steel member and the Ni-based brazing filler metal. Therefore, it is possible to suppress damages of the joint part.

The steel member may comprise a structural steel material containing 0.30 to 0.45 wt % of C and 0.85 to 1.25 wt % of Cr, or a martensitic stainless steel material containing at most 0.15 wt % of C and 11.5 to 13 wt % of Cr. The steel member may have a carbide and a nitride having a carbon and a nitrogen, respectively, bonded to at least one of the alloy elements including Cr, by thermal treatment, for example, at least on a side of a boundary with the Ni-based brazing filler metal in the structural steel material.

The nitrogen is usually mixed in during production (melting) of the steel member. A part of the nitrogen may be one contained in the steel material.

As described above, a part of carbon and nitrogen (e.g. nitrogen taken in from the atmosphere by thermal treatment) in the steel member form a bond with an alloy element such as Cr by e.g. thermal treatment to form a carbide and a nitride. When carbon and nitrogen are present in the steel member not in a solid solution state, transfer by diffusion is not easy. That is, as long as carbon and nitrogen are present as a carbide and a nitride, the carbon and nitrogen contained in the carbide and the nitride are not capable of movement by diffusion, and it is thereby possible to suppress diffusion of carbon and nitrogen from the steel member to the TiAl-based alloy member.

Further, as a part of carbon contained in the steel member forms a carbide, the amount of carbon will be decreased. Therefore, it is possible to suppress formation of voids, titanium carbide or a nitride in the vicinity of the boundary between the steel member and the brazing. The steel member has a carbide; however, the steel member has a steel structure homogenized and has the carbide spheroidized by thermal treatment. Thus, such a carbide will not be a weak point of strength as titanium carbide formed in a conventional steel member.

Further, in any of the above steel members, as the amount of carbon contained in the steel member is small, the amount of carbon diffused outside the steel member may also be small. It is thereby possible to suppress formation of voids and titanium carbide (even in the case of a steel material containing titanium) in the vicinity of the boundary between the steel member and the brazing.

Further, as the structural steel material contains Cr in an amount of 0.85 to 1.25 wt %, or the martensitic stainless steel material contains Cr in an amount of 11.5 to 13 wt %, the strength of the steel member may be substantially increased.

The TiAl-based alloy member may be a turbine wheel of a turbine, and the steel member may be a shaft of the turbine.

Such TiAl-based alloy member as a turbine wheel of a turbine and such steel member s a shaft of a turbine may be used for a turbocharger for e.g. automobiles or trucks.

Advantageous Effects

According to the present invention, a joint part capable of suppressing diffusion of carbon and nitrogen contained in the steel member to the TiAl-based alloy member and suppressing formation of voids, titanium carbide or a nitride due to diffusion of carbon and nitrogen contained in the steel member, and thereby suppressing decrease in the brazing strength, may be provided.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not limitative of the scope of the present invention.

Figure 1:
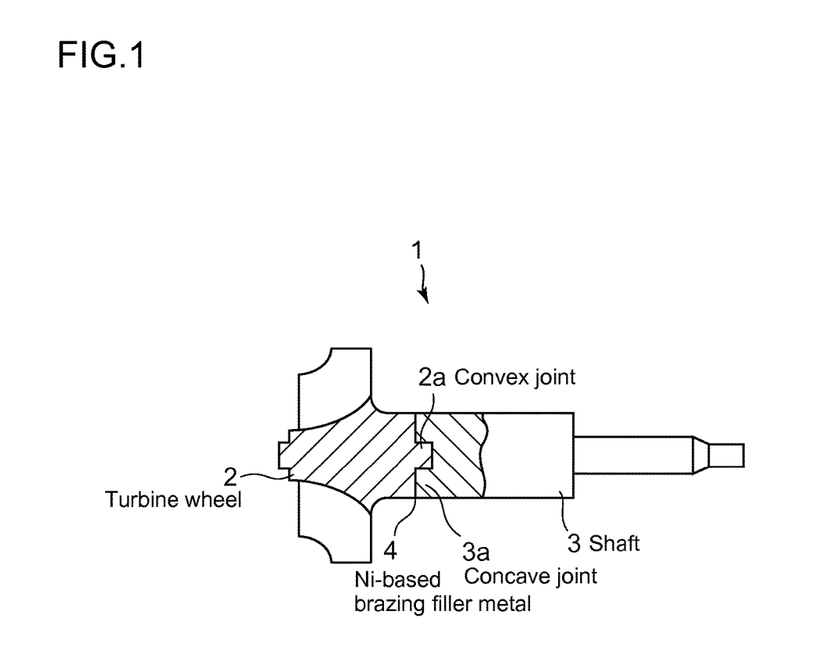
FIG. 1 is a cross-sectional view illustrating a turbine for a compact turbocharger for an automobile according to a first embodiment of the present invention.

FIG. 1 is a cross-sectional view illustrating a turbine for a compact turbocharger for an automobile according to a first embodiment of the present invention.

As illustrated in FIG. 1, a turbine component (hereinafter referred to as turbine body 1) used as a turbine for a compact turbocharger for an automobile comprises a turbine wheel 2 and a shaft 3. The turbine wheel 2 has a convex joint 2a, and the shaft has a concave joint 3a. The convex joint 2a and the concave joint 3a are fitted together, and the turbine wheel 2 and the shaft 3 are joined to each other with a Ni-based brazing filler metal 4. The turbine wheel 2 and the shaft 3 are joined by adding the Ni-based brazing filler metal 4 between the turbine wheel 2 and the shaft 3 under a vacuum atmosphere.

The turbine wheel 2 is composed of a TiAl-based alloy. The TiAl-based alloy contains Ti as the main constituent element and 28 to 35 wt % of Al, and it may further contain an additive element such as Nb, Cr, Mn, Si, W, C or B. In this embodiment, a TiAl-based alloy containing 31.3 wt % of Ti, 7.0 wt % of Al, 1.3 wt % of Nb and 0.03 wt % of C, and having been subjected to HIP treatment for a certain period of time at a temperature of at least 1,200° C. after precision casting for the purpose of eliminating cast defect, was used.

The shaft 3 is composed of a structural steel material. The structural steel material contains Fe as the main constituent element, 0.30 to 0.45 wt % of C, 0.85 to 1.25 wt % of Cr, 0.30 to 1.65 wt % of Mn, at most 0.030 wt % of P and at most 0.030 wt % of S. The structural steel material may further contain an additive element such as Ni or Mo, or N at a level of unavoidable impurities. An avoidable impurity means a substance contained in a slight amount in a structural steel material, because it is present in a raw material or it is unavoidably mixed in during production process. A level of unavoidable impurities means an amount in which an unavoidable impurity has little influence on properties of the structural steel material.

As the structural steel material, a manganese steel, a manganese-chrome steel, a chrome steel, a chrome-molybdenum steel, a nickel-chrome steel, a nickel-chrome-molybdenum steel, or the like may be used.

In this embodiment, as the structural steel material, SCM435, which is a chrome-molybdenum steel containing 0.33 wt % of C and 0.90 wt % of Cr, was used.

The reason why the range of the composition of the structural steel material is defined as above will be described hereinafter.

Figure 2:
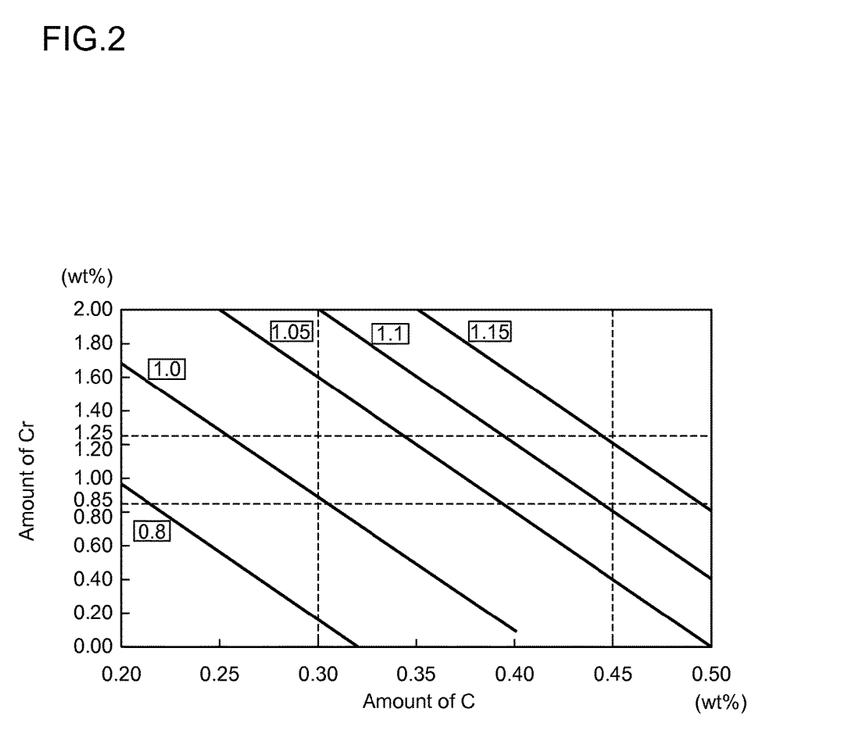
FIG. 2 is a chart showing relationship between amounts of C and Cr in a structural steel material, and a mechanical property of a shaft.

FIG. 2 is a chart showing relationship between amounts of C and Cr in a structural steel material, and a mechanical property of a shaft.

The numerical values in FIG. 2 (i.e. 0.8, 1.0, 1.05, 1.1 and 1.15) each represents a spec ratio (hereinafter referred to as "spec value") obtained by dividing the mechanical property (0.2% proof stress) of the shaft 3 after thermal treatment by the strength of the turbine wheel 2.

As shown in FIG. 2, as the amounts of C and Cr become larger, the strength of the shaft 3 becomes larger, that is, the spec value becomes larger.

Since the turbine wheel 2 of e.g. a turbocharger is rotated at a high speed, a minimum strength required for resisting a centrifugal stress is defined as the spec value. In the present embodiment, the spec value at the minimum strength was set to be 1.0. In order to satisfy this spec value at the minimum strength, as shown by the line representing the spec value of 1.0 in FIG. 2, at least 0.30 wt % of C and at least 0.85 wt % of Cr are required to be contained.

On the other hand, it is generally known that the structural steel which is the material for the shaft 3 has a better mechanical property after thermal treatment as the amounts of C and Cr are increased, but that as the strength becomes higher, the delayed cracking susceptibility after thermal treatment becomes higher. Since there is a risk of delayed crack if the strength is increased to at a strength level of a spec value of 1.15 in FIG. 2, the strength of the shaft 3 is preferably such that the speck value is at most 1.15. Therefore, based on the line representing the spec value of 1.15 in FIG. 2, the upper limits of the amount of C and Cr contained in the shaft 3 are set to be 0.45 wt % and 1.25 wt %, respectively.

A shaft 3 having a high strength may be produced by quenching and annealing of the structural steel material having the above composition.

Figure 3A:
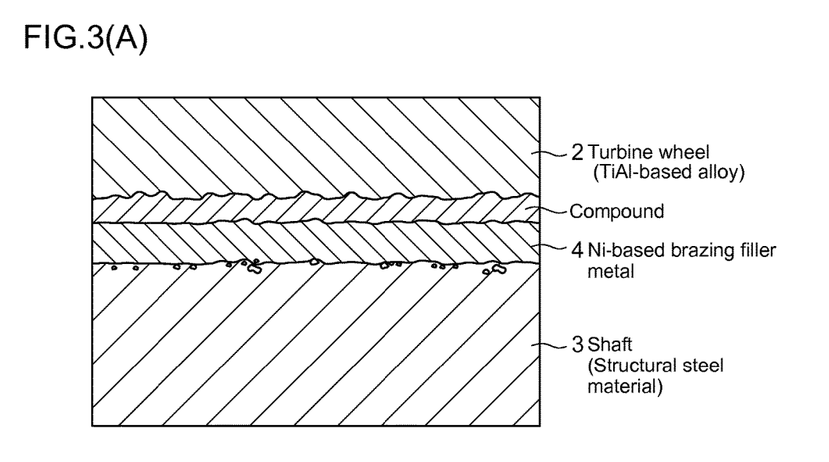
FIG. 3(A) is a schematic diagram illustrating a joint portion of a turbine wheel and a shaft of a turbine after operation under a high temperature condition over a long period of time.
Figure 3B:
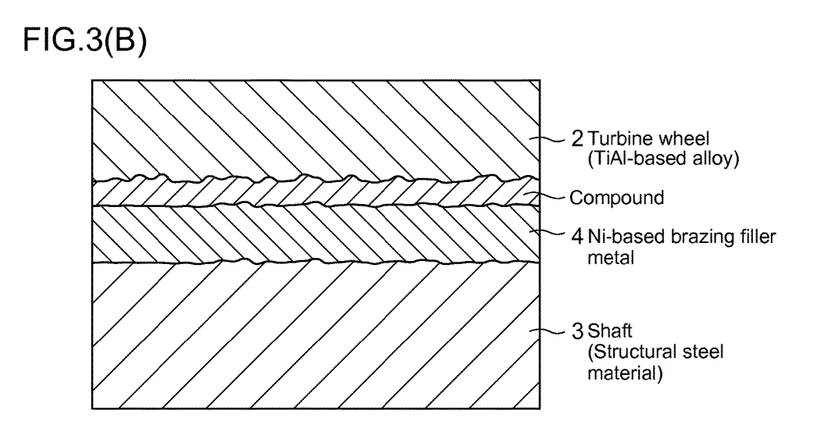
FIG. 3(B) is a schematic diagram illustrating a joint portion of a turbine wheel and a shaft of a normal turbine.

FIG. 3(A) is a schematic diagram illustrating a joint portion of a turbine wheel 2 and a shaft 3 of a turbine body 1 after operation under a high temperature condition over a long period of time. FIG. 3(B) is a schematic diagram illustrating a joint portion of a turbine wheel 2 and a shaft 3 of a normal turbine body 1.

As illustrated in FIG. 3(A) and FIG. 3(B), the turbine wheel 2 and the shaft 3 are joined to each other with the Ni-based brazing filler material. As illustrated in FIG. 3(A), within the shaft 3 or the Ni-based brazing filler material 4 after operation of the turbine body 1 under a high temperature condition over a long period of time, voids, titanium carbide or a nitride is hardly formed, and it is confirmed that a normal state is maintained similarly to the case of FIG. 3(B).

According to the joint part having the above composition. Cr contained in the shaft 3 forms a bond with a part of C to generate chrome carbide or chrome nitride, whereby it is possible to suppress generation of voids, titanium carbide or chrome nitride in the vicinity of the boundary between the shaft 3 and the Ni-based brazing filler metal 4. In a conventional joint part, C and N in the shaft 3 are diffused toward the turbine wheel 2 due to diffusion phenomena, whereby voids formed by diffusion of C, titanium carbide which is a carbide having a bond of Ti with C, or a nitride generated by diffusion of N, are formed a lot, and the brazing strength is significantly decreased. If a stress acts in the vicinity of the boundary between the turbine wheel 2 and the shaft 3 in such a state, cracks may arise and the shaft 3 may be damaged. On the other hand, in the shaft 3 according to the present invention, carbon will not be diffused toward the turbine wheel 2, and thus voids, titanium carbide or chrome nitride is hardly formed in the vicinity of the boundary between the shaft 3 and the Ni-based brazing filler metal. Further, as the amount of C contained in the shaft 3 is small, the amount of C to be diffused outside the shaft also becomes small. It is thereby possible to reduce voids formed in the shaft 3.

Furthermore, as the shaft 3 contains Cr, it is possible to increase the strength of the shaft 3 in spite of the small amount of C.

Further, since the diffusion of C can be suppressed, the turbine body 1 will not be damaged even after a long period of use under a high temperature of about 900° C. to 1,000° C.

The shaft 3 has chrome carbide; however, the shaft 3 has a steel structure homogenized and has the carbide spheroidized by thermal treatment. Thus, such a carbide will not be a weak point of strength as titanium carbide formed in a conventional steel member.

In this embodiment, a case where Cr is contained so as to be bonded with C. However, the element to be bonded with C is not limited to Cr, and it may, for example, be Nb or V.

A second embodiment of the present invention will be described hereinafter. In the following description, the same elements as those of the above embodiment are assigned with the same reference numerals as those of the above embodiment, and the same description thereof will be omitted, and difference from the above embodiment will be mainly described. The shaft 3 of the turbine body according to the second embodiment is composed of a martensitic stainless steel material.

As described above, in the first embodiment, by employing a structural steel material as the shaft 3, diffusion of C is suppressed, and decrease in the brazing strength is suppressed. Meanwhile, with improvement of fuel consumption of e.g. engines for automobiles in recent years, exhaust gas temperature has been increased up to about 1,000° C. When the exhaust gas temperature is increased, the Ni-based brazing filler metal 4 of the turbine body 1 may also be exposed to high temperature. Then, the brazing strength may be decreased after a long period operation even when the structural steel material is employed as the shaft 3. In such a case where the turbine body 1 is exposed to high temperature for a long period of time, a martensitic stainless steel material may be employed as the shaft 3.

The turbine body 1 according to the second embodiment comprises a turbine wheel 2 and a shaft 3. The turbine wheel 2 is composed of a TiAl-based alloy similarly to the case of the first embodiment.

The shaft 3 is composed of a martensitic stainless steel material. The martensitic stainless steel material contains Fe as the main constituent element, at most 0.15 wt % of C, 11.5 to 13 wt % of Cr, at most 1.00 wt % of Si, at most 1.25 wt % of Mn and at most 0.060 wt % of P. The martensitic stainless steel material may further contain an additive element such as S, Ni, Mo or Pb, or N at a level of unavoidable impurities.

As the martensitic stainless steel material, a chrome stainless steel such as SUS403, SUS410, SUS410J1, SUS410F2, SUS416, SUS420J1, SUS420J2, SUS420F, SUS420F2, SUS431, SUS440A, SUS440B, SUS440C or SUS440F may, for example, be employed.

In this embodiment, as the martensitic stainless steel material, SUS 403, which is a high-strength steel material containing 0.15 wt % of C and 13 wt % of Cr, was employed.

The reason why the range of the composition of the martensitic steel material is defined as above will be described hereinafter.

Regarding C, in general, a strength of a steel can be increased by containing more C. However, when C is contained in a large amount, as described above, many C may be diffused, whereby many voids and titanium carbide may be formed in the vicinity of the boundary between the shaft 3 and the Ni-based brazing filler metal 4. Further, even if C is intended to be formed into chrome carbide in order to suppress the diffusion as the structural steel material described in the first embodiment, C may not be formed into chrome carbide in the steel material when the operating temperature of the turbine body 1 becomes about 1,000° C., and a small amount of carbon remaining in a solid solution state may be diffused toward the turbine wheel 2, whereby voids and titanium carbide may be formed. Thus, in a case where the exhaust gas temperature becomes about 1,000° C., it is required that the amount of C is smaller than the case of the structural steel material. In this embodiment, a large amount of Cr is contained to ensure the strength of the shaft 3, and at most 0.15 wt % of C is contained to suppress formation of voids or titanium carbide in the vicinity of the boundary between the shaft 3 and the Ni-based brazing filler metal 4.

Figure 4:
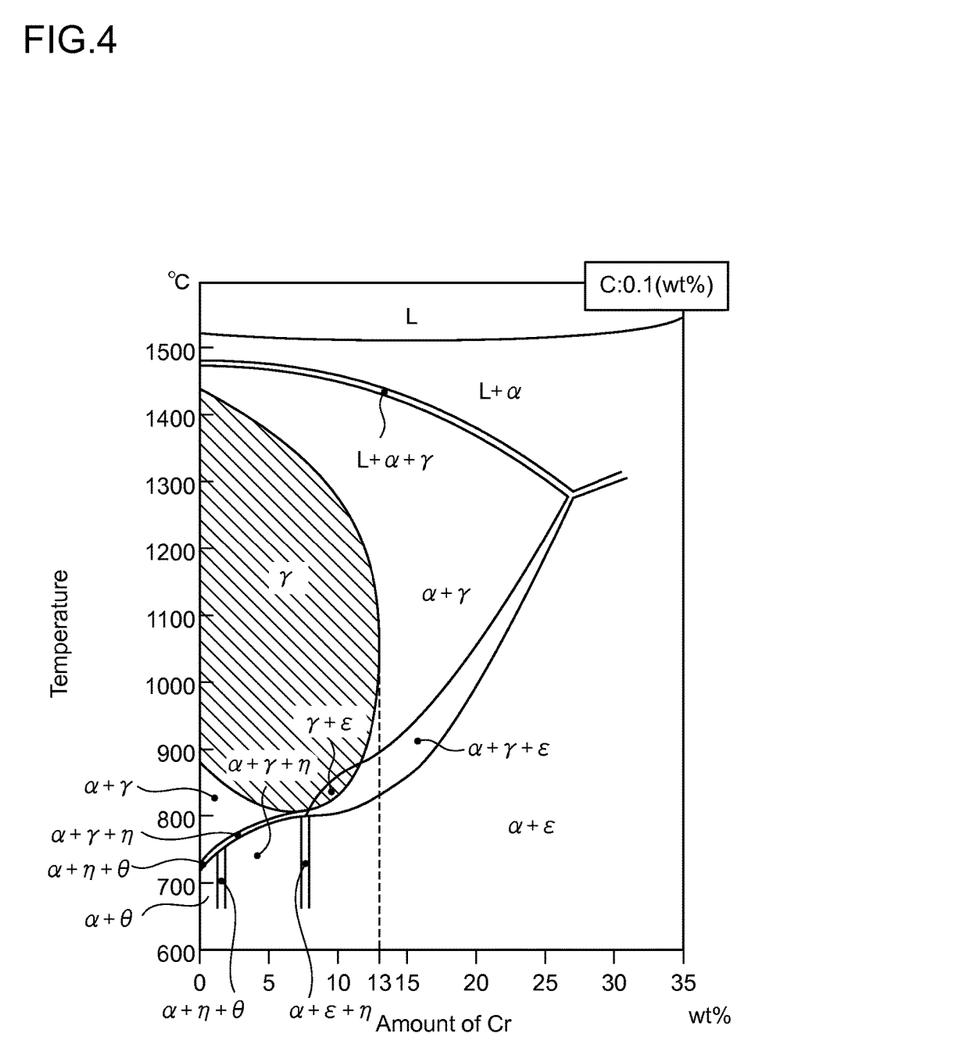
FIG. 4 is a chart showing relationship between amount of Cr and structure in temperature ranges in a case of a martensitic stainless steel containing 0.1 wt % of C.

Regarding Cr, in order to compensate for decrease in strength of the shaft 3 due to the smaller amount of C, Cr is contained in an amount of at least 11.5 wt %. FIG. 4 is a chart showing relationship between the amount of Cr and the structure in several temperature ranges in a case of the martensitic stainless steel containing 0.1 wt % of C. The hatching area in FIG. 4 represents the γ phase. As shown in FIG. 4, in a case where Cr is at most 13 wt %, when the steel in the region of the γ phase is cooled from the temperature of about 1,000° C., transformation from the γ phase to the α phase occurs in the temperature range of from 800° C. to 900° C. On the other hand, in a case where Cr is more than 13 wt %, as the steel is outside the γ phase, transformation from the γ phase to the α phase does not occur during thermal treatment, and the steel becomes a δ ferritic stainless steel, whereby it is not possible to increase the strength of the shaft 3. Therefore, the amount of Cr is set to be at most 13 wt %. As described above, in this embodiment, the amount of Cr is 11.5 to 13 wt %.

A shaft 3 having a high strength may be produced by quenching the martensitic stainless steel having the above composition at a temperature of about 800° C. to 1,200° C. and then annealing it at a temperature of at most 800° C.

According to the joint part having the above composition, the amount of C contained in the shaft 3 is small, and therefore it is possible to suppress diffusion of C as compared with a common stainless steel containing a large amount of C. Thus, voids or titanium carbide is hardly formed in the vicinity of the boundary between the shaft 3 and the Ni-based brazing filler metal 4. It is thereby possible to suppress cracks arising in the vicinity of the boundary between the shaft 3 and the Ni-based brazing filler metal 4.

Further, although the amount of C contained in the shaft 3 is small, a large amount of Cr is contained, whereby it is possible to increase the strength of the shaft 3.

Further, a part of C contained in the shaft 3 is bonded to Cr by thermal treatment to form chrome carbide. Since chrome carbide is excellent in structure stability even under a high temperature condition, even under a high temperature condition during operation of a turbocharger, chrome carbide will not be decomposed, and the shaft 3 will not be in a state such that C becomes solid solution therein. Thus, movement of C contained in the form of chrome carbide in the shaft 3 is limited, and diffusion of C from the shaft 3 toward turbine wheel 2 can be suppressed. Therefore, even after a long period of use under a high temperature of about 900° C. to 1,000° C., the turbine body 1 will not be damaged.

The invention claimed is:

1. A joint part comprising:
   a steel member turbine shaft containing alloy elements including C and Cr,
   a turbine wheel comprising a TiAl-based alloy member, and
   a Ni-based brazing filler metal via which the turbine shaft and the turbine wheel are joined to each other,
   wherein the turbine shaft has a carbide and a nitride each forming a bond with at least one of the alloy elements at least on a side of a boundary with the Ni-based brazing filler metal, and diffusion of C and N to the Ni-based brazing filler metal adjacent to the turbine wheel is suppressed by the carbide and the nitride under a high temperature of from 900° C. to 1,000° C.,
   wherein the steel member turbine shaft comprises a structural steel material containing 0.30 to 0.45 wt % of C and greater than 1.0 up to 1.25 wt % of Cr, and
   wherein a spec value at which a minimum strength for resisting a centrifugal stress is equal to or more than 1.0 and equal to or less than 1.15, the spec value being obtained b dividing 0.2% proof stress of the turbine shaft after thermal treatment by a strength of the turbine wheel.

2. The joint part according to claim 1,
   wherein the turbine shaft has a carbide and a nitride having a carbon and a nitrogen, respectively, bonded to at least one of the alloy elements including Cr at least on a side of a boundary with the Ni-based brazing filler metal in the structural steel material.

3. The joint part according to claim 2, wherein the nitrogen is mixed in during production of the steel member.

4. The joint part of claim 1, wherein the steel member turbine shaft comprises a structural steel material containing 0.30 to 0.35 wt % of C.

5. The joint part of claim 1, wherein the steel member turbine shaft comprises a structural steel material containing 0.44 to 0.45 wt % of C.

* * * * *